(12) United States Patent
Kenjo

(10) Patent No.: US 11,064,129 B2
(45) Date of Patent: Jul. 13, 2021

(54) IMAGE PROCESSING APPARATUS, IMAGE PROCESSING METHOD, IMAGING APPARATUS, AND PROGRAM

(71) Applicant: Sony Corporation, Tokyo (JP)

(72) Inventor: Yukinao Kenjo, Tokyo (JP)

(73) Assignee: Sony Corporation, Tokyo (JP)

( * ) Notice: Subject to any disclaimer, the term of this patent is extended or adjusted under 35 U.S.C. 154(b) by 152 days.

(21) Appl. No.: 16/087,791

(22) PCT Filed: May 2, 2017

(86) PCT No.: PCT/JP2017/017218
§ 371 (c)(1),
(2) Date: Sep. 24, 2018

(87) PCT Pub. No.: WO2017/199758
PCT Pub. Date: Nov. 23, 2017

(65) Prior Publication Data
US 2020/0221007 A1    Jul. 9, 2020

(30) Foreign Application Priority Data

May 16, 2016    (JP) .............................. JP2016-097883

(51) Int. Cl.
*H04N 5/235* (2006.01)
*H04N 5/232* (2006.01)

(52) U.S. Cl.
CPC ......... *H04N 5/2353* (2013.01); *H04N 5/2327* (2013.01); *H04N 5/23254* (2013.01)

(58) Field of Classification Search
CPC ............. H04N 5/2353; H04N 5/23254; H04N 5/2327; H04N 5/235; H04N 5/243
See application file for complete search history.

(56) References Cited

U.S. PATENT DOCUMENTS 10,032,293 B2 *   7/2018   Rifu ...................... G06T 11/005
10,937,209 B2 *   3/2021   Lee ...................... A61B 6/5264
(Continued)

FOREIGN PATENT DOCUMENTS

| JP | 2001-346096 A | 12/2001 |
| JP | 2007-202098 A | 8/2007 |
| JP | 2013-66142 A | 4/2013 |

*Primary Examiner* — Antoinette T Spinks
(74) *Attorney, Agent, or Firm* — Michael Best & Friedrich LLP

(57) ABSTRACT

The present technology relates to an image processing apparatus, an image processing method, an imaging apparatus, and a program that enable motion correction to be performed more appropriately.
Provided are a synthesizing unit that synthesizes a plurality of images captured at different timings; and a motion correction unit that performs correction that reduces influence on the images relating to motion, in which the motion correction unit sets a criterion of a section for which motion amount information relating to a motion amount supplied at a predetermined interval is referred to, on the basis of a synthesis ratio when the plurality of images is synthesized, and refers to the motion amount information according to the set criterion to perform the correction. The plurality of images is a long-time exposure image captured during a long-time exposure period and a short-time exposure image captured during a short-time exposure period, and the synthesizing unit synthesizes the long-time exposure image and the short-time exposure image at the synthesis ratio to generate an image with a higher dynamic range. The present technology can be applied to an imaging apparatus.

20 Claims, 10 Drawing Sheets

(56) References Cited

U.S. PATENT DOCUMENTS

2007/0040918 A1\* 2/2007 Kondo .............. H04N 5/23264
                                                    348/241
2016/0225170 A1\* 8/2016 Rifu ..................... G06T 11/005

\* cited by examiner

IMAGE PROCESSING APPARATUS, IMAGE PROCESSING METHOD, IMAGING APPARATUS, AND PROGRAM

TECHNICAL FIELD

The present technology relates to an image processing apparatus, an image processing method, an imaging apparatus and a program and, for example, to an image processing apparatus, an image processing method, an imaging apparatus, and a program that are enabled to more appropriately reduce the influence of motion on image quality.

BACKGROUND ART

Conventionally, a dynamic range expansion technology for an imaging apparatus exists. For example, a time-sharing technique is known in which images are captured with different sensitivities by time sharing and a plurality of images captured by time sharing is synthesized (for example, refer to Patent Document 1).

CITATION LIST

Patent Document

Patent Document 1: Japanese Patent Application Laid-Open No. 2001-346096

SUMMARY OF THE INVENTION

Problems to be Solved by the Invention

For example, in a case where correction for reducing the influence of deviation due to motion such as camera shake (hereinafter mentioned as motion correction) is performed, a recording frame is used as a criterion. In a case where images captured with different sensitivities by time sharing are synthesized as described above, motion correction is performed using an image after synthesis as a criterion. However, there is a possibility that the correction accuracy is lowered by performing the motion correction without considering at what proportion the images captured with different sensitivities have been synthesized.

The present technology has been made in view of such a situation and makes it possible to more appropriately perform correction for reducing influence due to motion.

Solutions to Problems

An image processing apparatus according to one aspect of the present technology includes: a synthesizing unit that synthesizes a plurality of images captured at different timings; and a motion correction unit that performs correction that reduces influence on the images relating to motion, in which the motion correction unit sets a criterion of a section for which motion amount information relating to a motion amount supplied at a predetermined interval is referred to, on the basis of a synthesis ratio when the plurality of images is synthesized, and refers to the motion amount information according to the set criterion to perform the correction.

An image processing method according to one aspect of the present technology includes a process including steps of: synthesizing a plurality of images captured at different timings; and performing motion correction that reduces influence on the images relating to motion, the process performing the motion correction by: setting a criterion of a section for which motion amount information relating to a motion amount supplied at a predetermined interval is referred to, on the basis of a synthesis ratio when the plurality of images is synthesized; and referring to the motion amount information according to the set criterion.

An imaging apparatus according to one aspect of the present technology includes an image processing apparatus provided with: a synthesizing unit that synthesizes a plurality of images captured at different timings; and a motion correction unit that performs correction that reduces influence on the images relating to motion, in which the motion correction unit: sets a criterion of a section for which motion amount information relating to a motion amount supplied at a predetermined interval is referred to, on the basis of a synthesis ratio when the plurality of images is synthesized; and refers to the motion amount information according to the set criterion to perform the correction.

A program according to one aspect of the present technology causes a computer to execute: a process including steps of: synthesizing a plurality of images captured at different timings; and performing motion correction that reduces influence on the images relating to motion, the process performing the motion correction by: setting a criterion of a section for which motion amount information relating to a motion amount supplied at a predetermined interval is referred to, on the basis of a synthesis ratio when the plurality of images is synthesized; and referring to the motion amount information according to the set criterion.

In the image processing apparatus, the image processing method, and the program according to one aspect of the present technology, a plurality of images captured at different timings is synthesized and motion correction that reduces influence on the images relating to motion is performed. This motion correction is performed by setting a criterion of a section for which motion amount information relating to a motion amount supplied at a predetermined interval is referred to, on the basis of a synthesis ratio when the plurality of images is synthesized, and referring to the motion amount information according to the set criterion.

In the imaging apparatus according to one aspect of the present technology, the image processing apparatus is provided.

Note that the image processing apparatus and the imaging processing apparatus each may be an independent apparatus or an internal block constituting one apparatus.

Furthermore, the program can be provided by being transmitted via a transmission medium or by being recorded on a recording medium.

Effects of the Invention

According to one aspect of the present technology, correction that reduces influence due to motion can be performed more appropriately.

Note that the effects described herein are not necessarily limited and any effects described in the present disclosure may be applied.

MODE FOR CARRYING OUT THE INVENTION

Hereinafter, modes for carrying out the present technology (hereinafter referred to as embodiments) will be described. The present technology described below can be applied to an apparatus that performs correction for reducing the influence of deviation (blur) due to motion (hereinafter mentioned as motion correction). Furthermore, the present technology can be applied to an apparatus that captures an image with a high dynamic range and performs the motion correction on such an image with a high dynamic range to improve image quality.

Additionally, the present technology can also be applied to an apparatus that improves image quality by performing a plurality of times of imaging with an equal exposure time (imaging with an equal exposure time but at different timings) and performing a process of reducing noise through position alignment and synthesis processes.

Here, a case where an image with a high dynamic range is captured and the motion correction is performed on such an image with a high dynamic range will be described as an example.

<About Outline of Generation Process for High Dynamic Range Image>

First, an outline of a generation process for a high dynamic range image will be described. A high dynamic range image can be generated by synthesizing a long-time exposure image and a short-time exposure image. A generation process for the high dynamic range image will be described with reference to FIG. 1.

Figure 1:
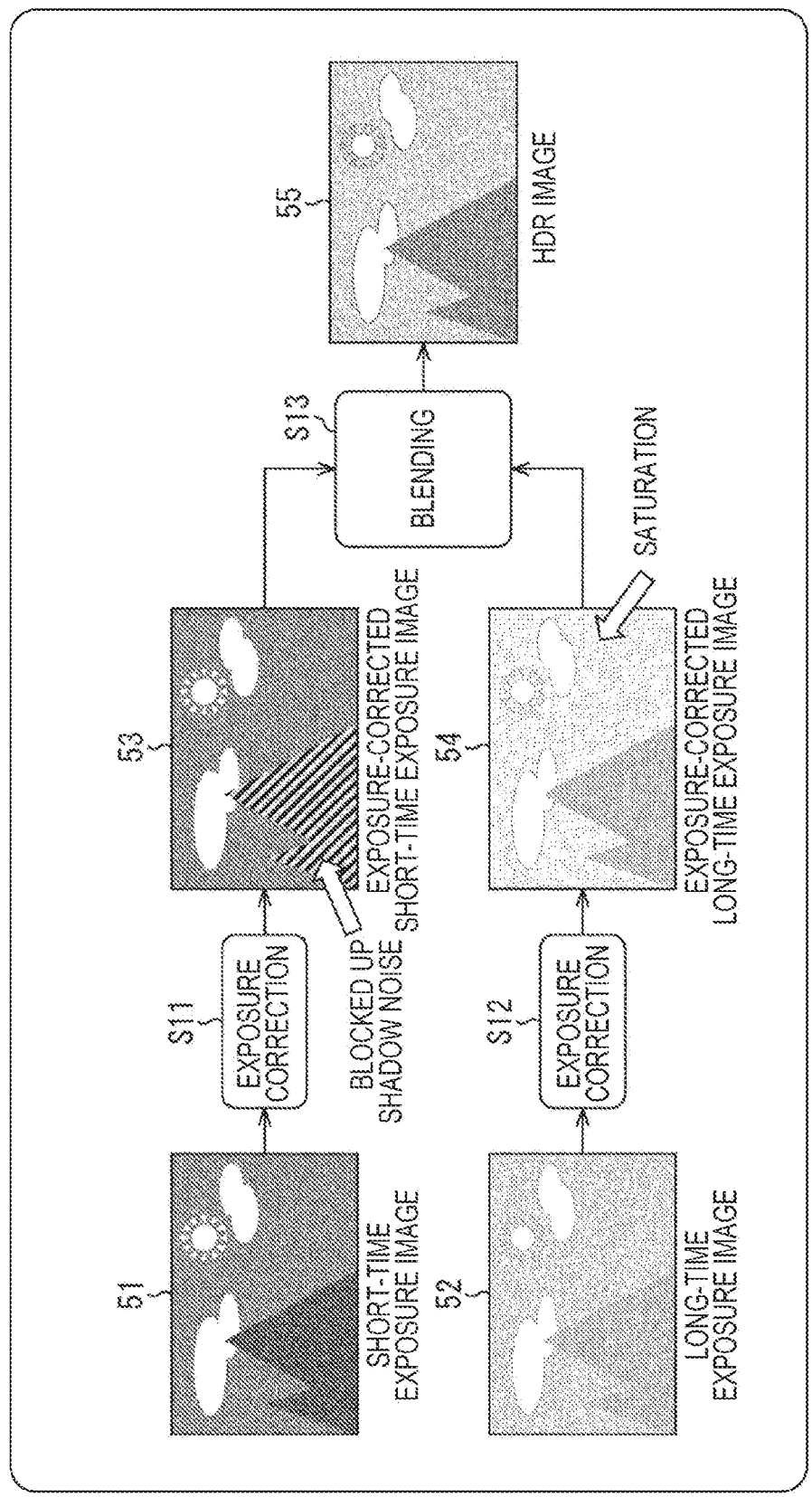
FIG. 1 is a diagram for explaining a generation process for a high dynamic range image.

FIG. 1 illustrates an example of a process of synthesizing (blending) a short-time exposure image 51 and a long-time exposure image 52 to generate a high dynamic range (HDR) image 55. The synthesizing (blending) process in the process of the present disclosure is a blending process for corresponding pixel values of the short-time exposure image 51 and the long-time exposure image 52 in accordance with a blending coefficient β and, by this blending process, each pixel value of an output image (synthetic image) is set.

First, in steps S11 and S12, exposure correction is performed by multiplying the short-time exposure image 51 and the long-time exposure image 52 by constants in accordance with an exposure ratio. For example, in the case of a 10-bit sensor with an exposure ratio of 16, the short-time exposure image is multiplied by 16 and the long-time exposure image is multiplied by one at the exposure correction stage; thereafter, in step S13, pixel values of corresponding pixels are synthesized (blended) to determine a pixel value of the HDR image 55 as the output image.

Note that the short-time exposure image after the exposure correction will be referred to as exposure-corrected short-time exposure image and the long-time exposure image after the exposure correction will be referred to as exposure-corrected long-time exposure image.

A specific sequence of the pixel value determination process for the HDR image 55 as the output image will be described.

For example, assuming

DS: pixel value of the exposure-corrected short-time exposure image,

DL: pixel value of the exposure-corrected long-time exposure image, and

DH: pixel value of the high dynamic range image to be output, the pixel value of the HDR image 55 is calculated in line with a formula indicated below during the blending process in step S13.

$$DH=(1.0-\beta)\times DS+\beta\times DL$$

Note that blending of pixel values in line with the above formula is performed for each corresponding pixel position of the exposure-corrected short-time exposure image and the exposure-corrected long-time exposure image. In other words, the blending process is performed for each imaging pixel position of the same subject such that each pixel value of the output image (HDR image) is determined.

Through such a process, for example, since the saturated pixel value of the exposure-corrected short-time exposure pixel is given as 1023×16=16368 (14 bits), a pixel value to be output is also given as 14 bits and the extension of the dynamic range is achieved.

However, there is a possibility that precise values as pixel values are not held in the exposure-corrected short-time exposure image 53 and the exposure-corrected long-time exposure image 54 obtained by performing the exposure correction through multiplication by constants in accordance with the exposure ratio in steps S11 and S12. In other words, a dark part of the short-time exposure image 53 may have blocked up shadows by noise and a bright part of the long-time exposure image 54 may have blown out highlights. Thus, a blending process that does not utilize pixel values of these error pixels is performed in the blending process in step S13. By such a process, an HDR image 55 with a good signal-to-noise (SN) ratio (SNR) from the bright part to the dark part can be obtained.

<Configuration of Imaging Apparatus>

Figure 2:
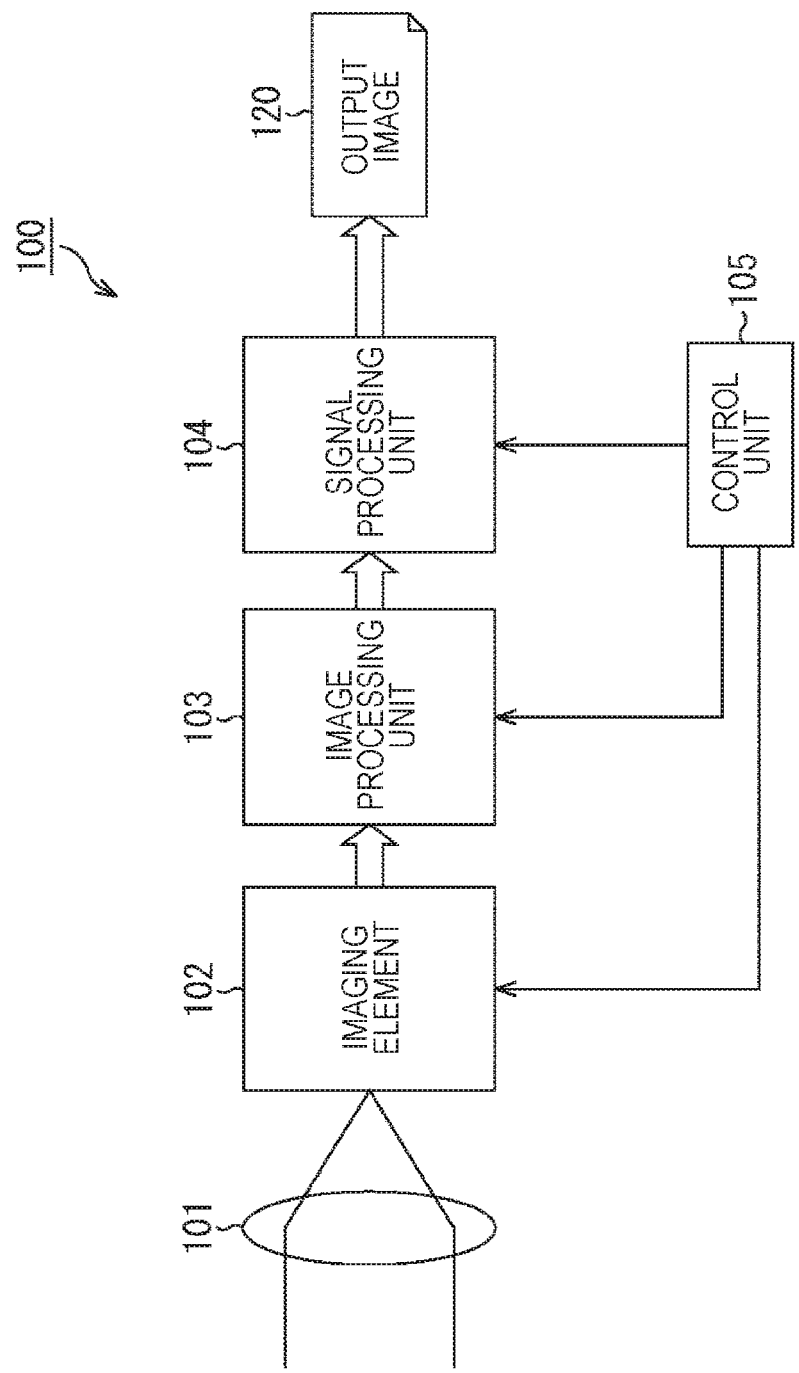
FIG. 2 is a diagram for explaining the configuration of an imaging apparatus to which the present technology is applied.

FIG. 2 is a diagram illustrating the configuration of an imaging apparatus according to an embodiment, to which the present technology is applied. Furthermore, the imaging apparatus 100 illustrated in FIG. 2 is an apparatus that generates the HDR image 55 by performing the process described with reference to FIG. 1.

In the imaging apparatus 100 illustrated in FIG. 2, light entering via an optical lens 101 is incident on an imaging element 102 constituted by an imaging unit such as a CMOS image sensor and the like and image data by photoelectric conversion is output. Output image data is input to an image processing unit 103.

The output image of the imaging element 102 is a so-called mosaic image in which any one of RGB pixel values is set to each pixel. The image processing unit 103 performs a demosaicing process of setting all of the RGB pixel values to each pixel, the above-described generation process for the high dynamic range (HDR) image based on the synthesis process for the long-time exposure image and the short-time exposure image, a motion correction process to be described later, and the like.

Motion amount information periodically issued from sensors such as an acceleration sensor and a gyro sensor is used for the motion correction process. A configuration with such sensors (not illustrated) provided inside the image processing unit 103 and a configuration with such sensors (not illustrated) provided outside the image processing unit 103 both can be adopted.

The output from the image processing unit 103 is input to a signal processing unit 104. The signal processing unit 104 executes signal processes for a general camera such as white balance (WB) adjustment, gamma correction, and the like to generate an output image 120. The output image 120 is saved in a storage unit (not illustrated). Alternatively, the output image 120 is output to a display unit (not illustrated).

A control unit 105 outputs a control signal to each unit in line with a program saved, for example, in a memory (not illustrated) and controls various processes.

<Configuration and Operation of Image Processing Unit>

Figure 3:
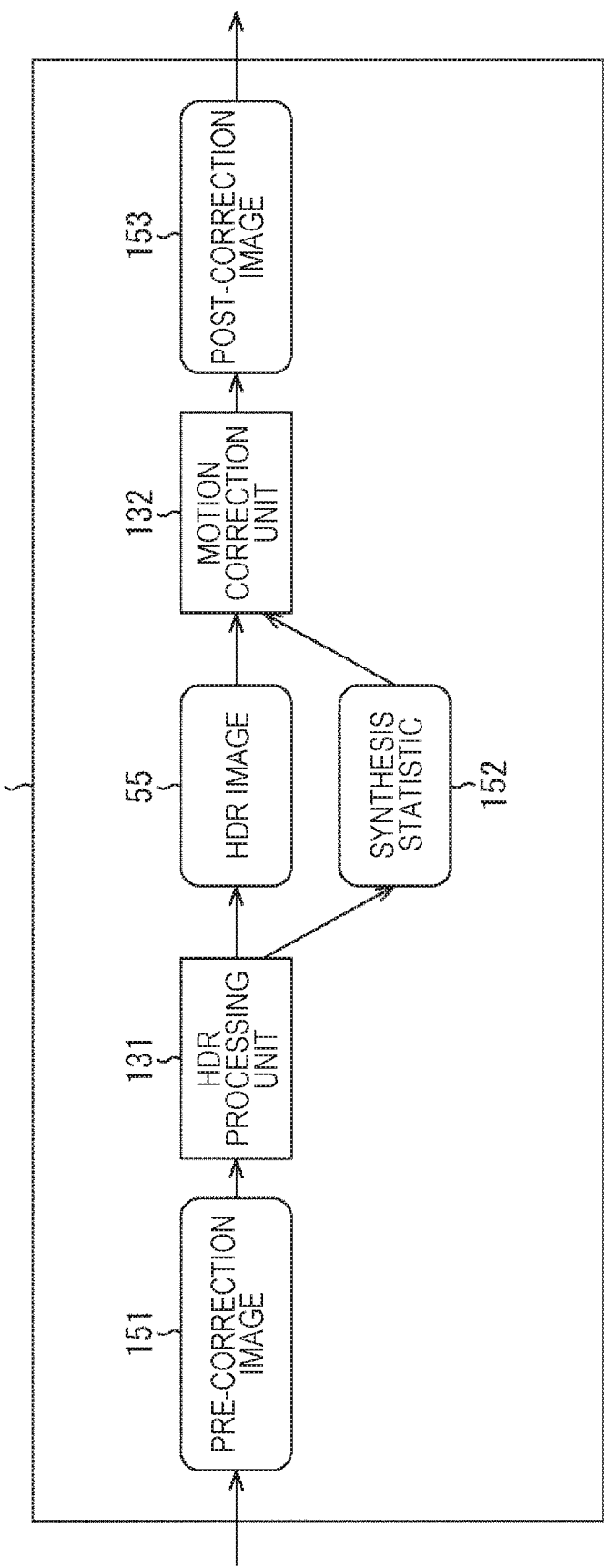
FIG. 3 is a diagram for explaining the configuration of an image processing unit.

Next, the configuration and operation of the image processing unit 103 will be described. FIG. 3 illustrates the configuration of the image processing unit 103. As described above, the image processing unit 103 performs the generation process for the high dynamic range image, the motion correction process, and the like. A pre-correction image 151 from the imaging element 102 is input to the image processing unit 103. The pre-correction image 151 is supplied to an HDR processing unit 131.

The HDR processing unit 131 generates the HDR image 55 from the supplied pre-correction image 151 to supply to a motion correction unit 132. The pre-correction image 151 means the long-time exposure image and the short-time exposure image and the HDR processing unit 131 generates the HDR image 55 from the supplied long-time exposure image and short-time exposure image to supply to the motion correction unit 132.

When generating the HDR image 55 (generating a synthetic image), the HDR processing unit 131 also generates a synthesis statistic 152 to supply to the motion correction unit 132. As will be described later with reference to FIG. 4, the total statistic 152 is a statistic associated with the time for which each of the long-time exposure image and the short-time exposure image is referred to, when the HDR image 55 is generated.

Furthermore, in the example to be described later, the total statistic 152 can be specified as a result of a histogram or a reference time center of gravity found from this histogram. The result of the histogram may be supplied to the motion correction unit 132 as the synthesis statistic 152 such that the reference time center of gravity is found from the histogram by the motion correction unit 132 or the reference time center of gravity may be supplied to the motion correction unit 132 as the synthesis statistic 152.

The motion correction unit 132 sets the motion amount information to be referred to, on the basis of the synthesis statistic 152 for the supplied HDR image 55 and, according to the referred motion amount information, calculates a correction amount for suppressing the influence due to motion to perform correction. The motion correction unit 132 outputs a post-correction image 153 on which the motion correction has been performed, to the signal processing unit 104 (FIG. 2).

First Embodiment: Acquisition of Motion Correction Amount Between Frames

Figure 4:
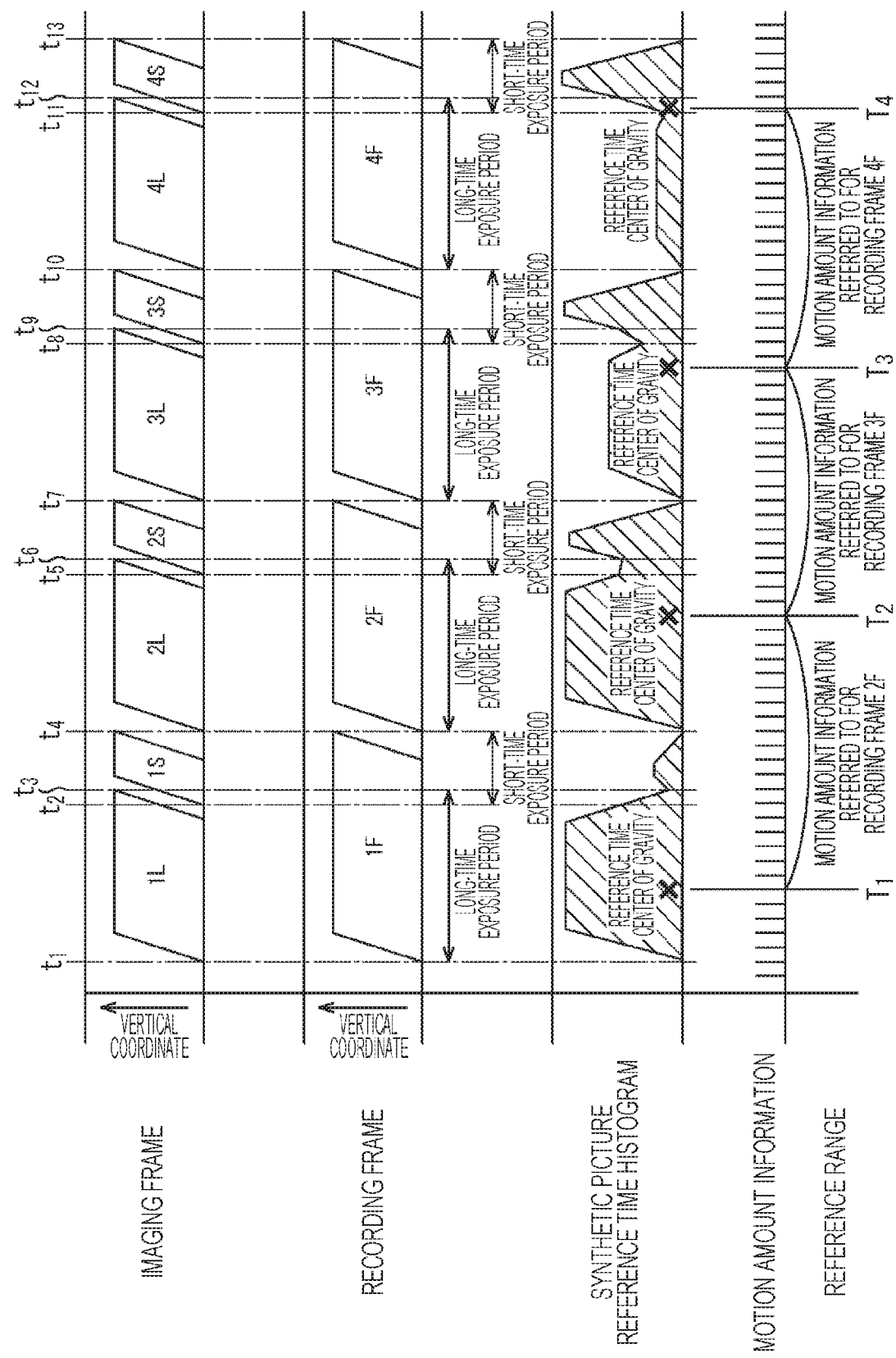
FIG. 4 is a diagram for explaining a case of finding a reference time center of gravity for each frame.

The processes of the HDR processing unit 131 and the motion correction unit 132 will be further described. FIG. 4 is a diagram illustrating relationships between an imaging frame, a recording frame, a synthetic picture reference time histogram, motion amount information, and a reference range.

Each of the long-time exposure image and the short-time exposure image is employed as an imaging frame and one recording frame is generated by synthesizing these long-time exposure image and short-time exposure image. For example, a period from time t1 to time t3 is specified as a long-time exposure period and an image captured by the imaging element 102 during this long-time exposure period is supplied to the image processing unit 103 (the HDR processing unit 131 therein) as a long-time exposure image 1L.

Furthermore, a period from the time t2 to time t4 is specified as a short-time exposure period and an image captured by the imaging element 102 during this short-time exposure period is supplied to the image processing unit 103 (the HDR processing unit 131 therein) as a short-time exposure image 1S. Then, a recording frame 1F (HDR image 55) is generated from the long-time exposure image 1L and the short-time exposure image 1S obtained from the time t1 to the time t4.

Similarly, a recording frame 2F (HDR image 55) is generated from a long-time exposure image 2L and a short-time exposure image 2S obtained from the time t4 to time t7, a recording frame 3F (HDR image 55) is generated from a long-time exposure image 3L and a short-time exposure image 3S obtained from the time t7 to time t10, and a recording frame 4F (HDR image 55) is generated from a long-time exposure image 4L and a short-time exposure image 4S obtained from the time t10 to time t13.

For example, when the recording frame 1F (HDR image 55) is generated from the long-time exposure image 1L and the short-time exposure image 1S obtained from the time t1 to the time t4, as described with reference to FIG. 1, the long-time exposure image 1L and the short-time exposure image 1S are synthesized at a predetermined ratio by the blending coefficient $\beta$. The blending coefficient $\beta$ is calculated, for example, by the following formula.

$$\beta = (VS)/(VS+VL)$$

In this case, the following assumption is satisfied:

VL: variance value of noise of a pixel of interest in the long-time exposure image after the exposure correction VS: variance value of noise of a pixel of interest in the short-time exposure image after the exposure correction However, under the condition that a long-time exposure pixel is saturated, correction is performed such that $\beta=0$ is satisfied.

The blending coefficient $\beta$ has a possibility of varying for each pixel (depending on the setting; for example, for each frame or for each line in the frame). The synthesis ratio between the long-time exposure image and the short-time exposure image has a possibility of varying for each pixel and is not constant.

Figure 5:
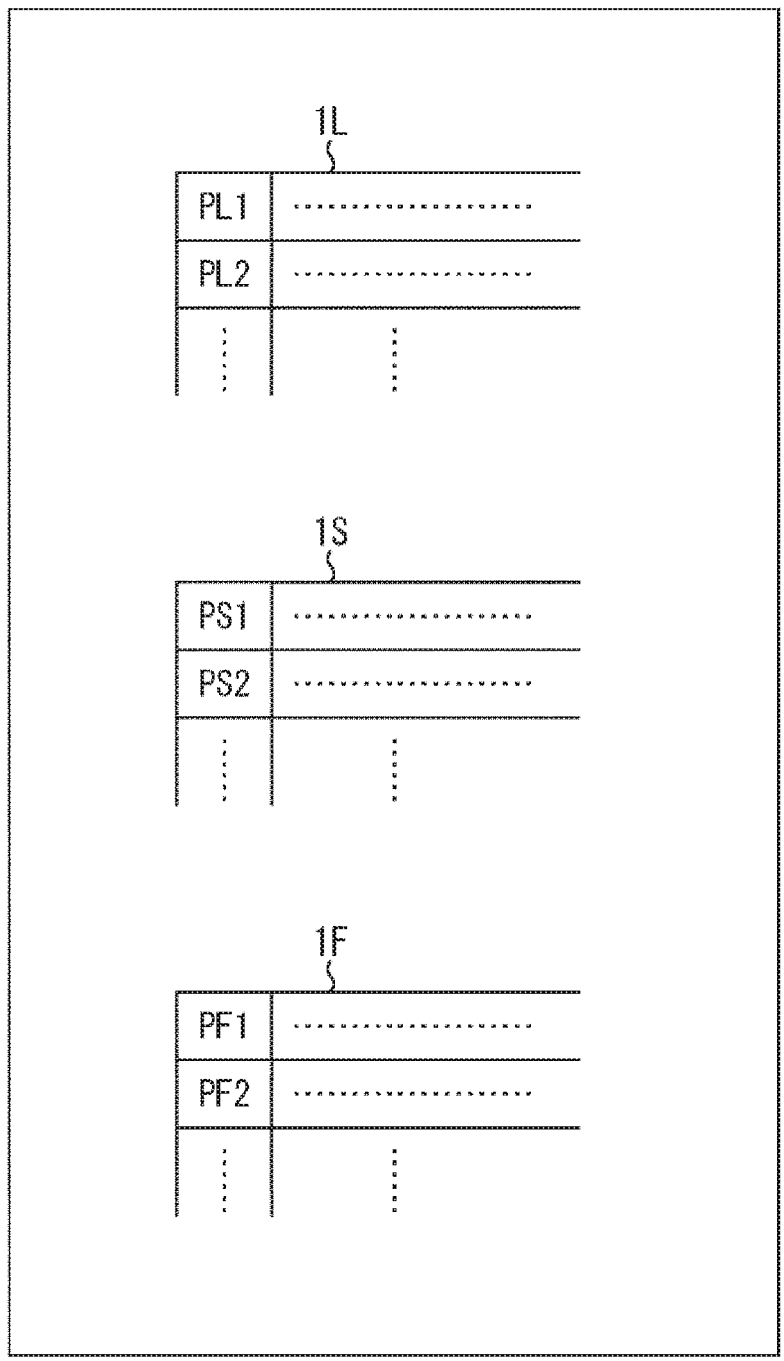
FIG. 5 is a diagram for explaining synthesis.

FIG. 5 is a diagram illustrating parts (pixel arrangements) of the recording frame 1F, the long-time exposure image 1L, and the short-time exposure image 1S, by supposing a case where data acquired during the long-time exposure period and data acquired during the short-time exposure time are individually developed in a frame memory and the recording frame 1F is generated from these developed long-time exposure image 1L and short-time exposure image 1S.

For example, a pixel PF1 of the recording frame 1F is generated from a pixel PL1 of the long-time exposure image 1L and a pixel PS1 of the short-time exposure image 1S. The pixel PL1 of the long-time exposure image 1L, the pixel PS1 of the short-time exposure image 1S, and the pixel PF1 of the recording frame 1F are pixels located at the same position in each image. Similarly, a pixel PF2 of the recording frame 2F is generated from a pixel PL2 of the long-time exposure image 2L and a pixel PS2 of the short-time exposure image 2S.

For example, when the pixel PF1 of the recording frame 1F is generated from the pixel PL1 of the long-time exposure image 1L and the pixel PS1 of the short-time exposure image 1S, a blending ratio between the pixels PL1 and PS1 is set by the above-described blending coefficient β. It is assumed that the blending ratio between the pixels PL1 and PS1 is, for example, 2:1.

Furthermore, for example, it is assumed that, when the pixel PF2 of the recording frame 2F is generated from the pixel PL2 of the long-time exposure image 2L and the pixel PS2 of the short-time exposure image 2S, a blending ratio between the pixels PL2 and PS2 is, for example, 3:1.

In this manner, there is a possibility that the blending coefficient β and the blending ratio vary for each pixel. The HDR processing unit 131 sets the blending coefficient β and synthesizes a pixel PL of a long-time exposure image L and a pixel PS of a short-time exposure image S on the basis of this blending coefficient β, thereby generating a pixel PF of the HDR image 55 (recording frame F). Furthermore, while generating the HDR image 55 in such a manner, the HDR processing unit 131 also generates the synthetic picture reference time histogram (FIG. 4).

In the synthetic picture reference time histogram (FIG. 4), the lateral axis denotes time and the longitudinal axis denotes frequency. For example, the frequency can be regarded as the blending ratio (blending coefficient β). For example, it is assumed that the pixel PL1 of the long-time exposure image 1L and the pixel PL2 have pixel values acquired at the same time (assumed as time tL) and the pixel PS1 of the short-time exposure image 1S and the pixel PS2 have pixel values acquired at the same time (assumed as time tS). Furthermore, as described above, it is assumed that the blending ratio between the pixels PL1 and PS1 is 2:1 and the blending ratio between the pixels PL2 and PS2 is 3:1.

In such a case, the value of the synthetic picture reference time histogram at the time tL is given as 5 (=2+3). Furthermore, the value of the synthetic picture reference time histogram at the time tS is given as 2 (=1+1). In this manner, the value (blending ratio) is calculated for each time and the synthetic picture reference time histogram is generated. Note that, although the blending ratio (the value found from the blending coefficient β) has been described here as an example, it is also possible to create a histogram using other values.

The synthetic picture reference time histogram for each frame is generated in this manner. Then, the center of gravity in the generated synthetic picture reference time histogram is found and the position of the found center of gravity is taken as a reference time center of gravity. How to find this reference time center of gravity will be described later.

Motion amount information acquired in the time (section) between this reference time center of gravity and the next reference time center of gravity is used to calculate a motion correction amount. For example, in a case where time T1 is set as the reference time center of gravity from the synthetic picture reference time histogram when the recording frame 1F is processed and time T2 is set as the reference time center of gravity from the synthetic picture reference time histogram when the recording frame 2F is processed, motion amount information obtained from a section from the time T1 to the time T2 is specified as the motion amount information to be referred to for the recording frame 2F and the motion correction amount is calculated.

The motion amount information is output from sensors such as an acceleration sensor, a gyro sensor, and the like at every predetermined interval (cycle). Accordingly, in this case, if the section becomes longer, the motion amount information to be referred to becomes larger; if the section becomes shorter, the motion amount information to be referred to becomes smaller. Furthermore, in a case where the reference time center of gravity is located closer to the long-time exposure period side, the motion amount information obtained during the long-time exposure period becomes dominant and, in a case where the reference time center of gravity is located closer to the short-time exposure period side, the motion amount information obtained during the short-time exposure period becomes dominant.

The description is continued by returning to the explanation with reference to FIG. 4. Referring to the synthetic picture reference time histogram from the synthetic picture reference time histogram found from the recording frame 1F to the synthetic picture reference time histogram found from the recording frame 4F, the histogram found from the long-time exposure image L gradually becomes smaller and the histogram found from the short-time exposure image S gradually becomes larger. With such a change, the reference time center of gravity also moves to the side of the histogram found from the short-time exposure image S.

As described above, when a plurality of images captured at different timings, for example, with different exposure times, is synthesized, a section of information to be referred to in order to correct a blur amount due to motion or the like is set on the basis of the synthesis ratio of the images. Accordingly, more appropriate correction can be performed.

Figure 6:
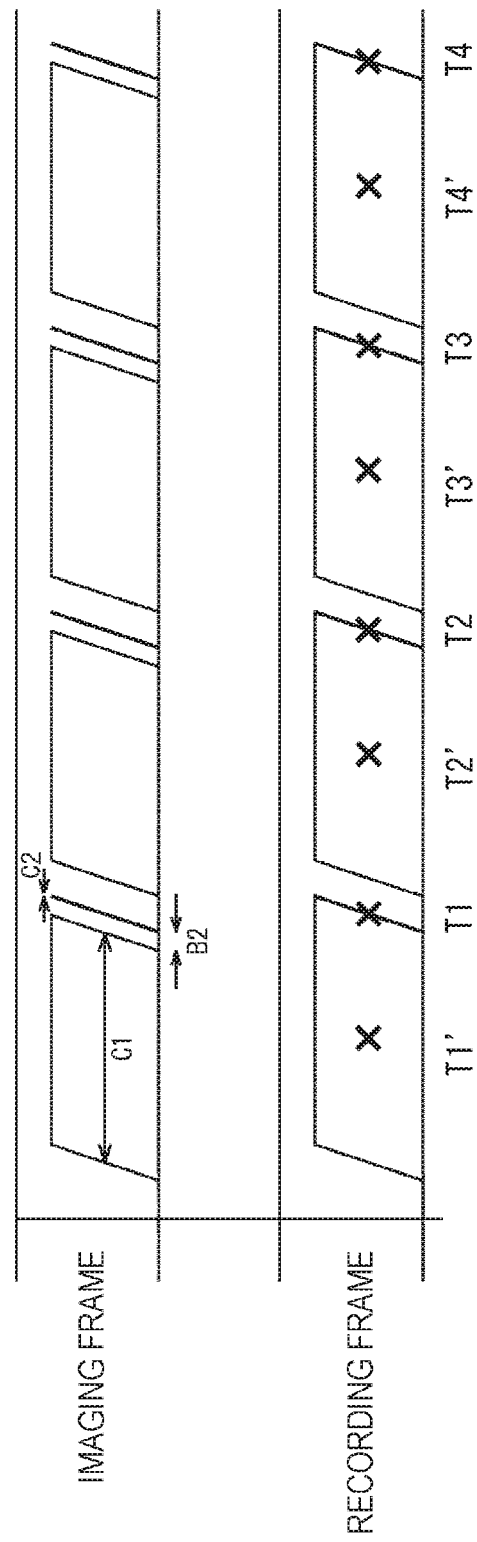
FIG. 6 is a diagram for explaining deviation of the reference time center of gravity.

Here, a further explanation will be given on that more appropriate correction can be performed. FIG. 6 represents an imaging frame and a recording frame as in FIG. 4 and is a diagram for comparing the case of calculating the reference time center of gravity as described above and the case of calculating the reference time center of gravity by a conventional method.

In FIG. 6, C1 represents a long-time exposure period and C2 represents a short-time exposure period. Furthermore, B2 represents an exposure interval between the long-time exposure period and the short-time exposure period. In addition, in FIG. 6, the time attached with a dash, such as T1', represents a reference time center of gravity calculated by the conventional method, whereas the time without a dash represents a reference time center of gravity calculated by applying the present technology.

In the example illustrated in FIG. 6, the recording frame rate is specified as 30 (ftp), the long-time exposure period C1 is specified as 31 (msec), the short-time exposure period C2 is specified as 0.1 (msec), and the exposure interval B2 is specified as 1 (msec). Furthermore, it is assumed here that the blending ratio is set such that the entire short-time exposure image is used and the long-time exposure image is not blended.

In the case of such a situation, the reference time center of gravity is set on the short-time exposure image side, according to the present embodiment described above. In FIG. 6, as indicated as time T1, time T2, time T3, and time T4, the reference time center of gravity is set on the short-time exposure image side, specifically, at the central time of the short-time exposure period.

On the other hand, in the case of such a situation, according to the setting of the conventional reference time center of gravity, for example, the time at the center of one recording frame, in different terms, the center time of a period obtained by adding the long-time exposure period C1, the short-time exposure period C2, and the exposure interval B2 is set as the reference time center of gravity. The reference time center of gravity is set at the approximate center time of the long-time exposure period, as indicated as time T1', time T2', time T3', and time T4' in FIG. 6.

In the case of such a situation, the reference time center of gravity found by the present embodiment and the reference time center of gravity found by the conventional technique are significantly different from each other in some cases. In the situation illustrated in FIG. 6, a difference between the reference time center of gravity found by the present embodiment (for example, the time T1) and the reference time center of gravity found by the conventional technique (for example, the time T1') is given as the following value.

$$\begin{aligned} \text{Difference} &= (C1 + B2 + C2/2) - (C1 + B2 + C2)/2 \\ &= (C1 + B2)/2 \\ &= (31 + 1)/2 \\ &= 16 \text{ (msec)} \end{aligned}$$

In this case, since the recording frame is generated from the short-time exposure image, it is thought that appropriate motion correction can be performed by performing the motion correction while the motion amount information obtained when the short-time exposure image was captured is made dominant. According to the reference time center of gravity found by the present embodiment, since the motion amount information becomes dominant when the short-time exposure image is captured, appropriate motion correction can be performed.

However, in the reference time center of gravity found by the conventional technique, since the center time of the recording frame is set regardless of the blending ratio, the motion amount information when the long-time exposure image was captured becomes dominant even in the situation as illustrated in FIG. 6 and this leads to a possibility that appropriate motion correction cannot be performed.

Figure 7:
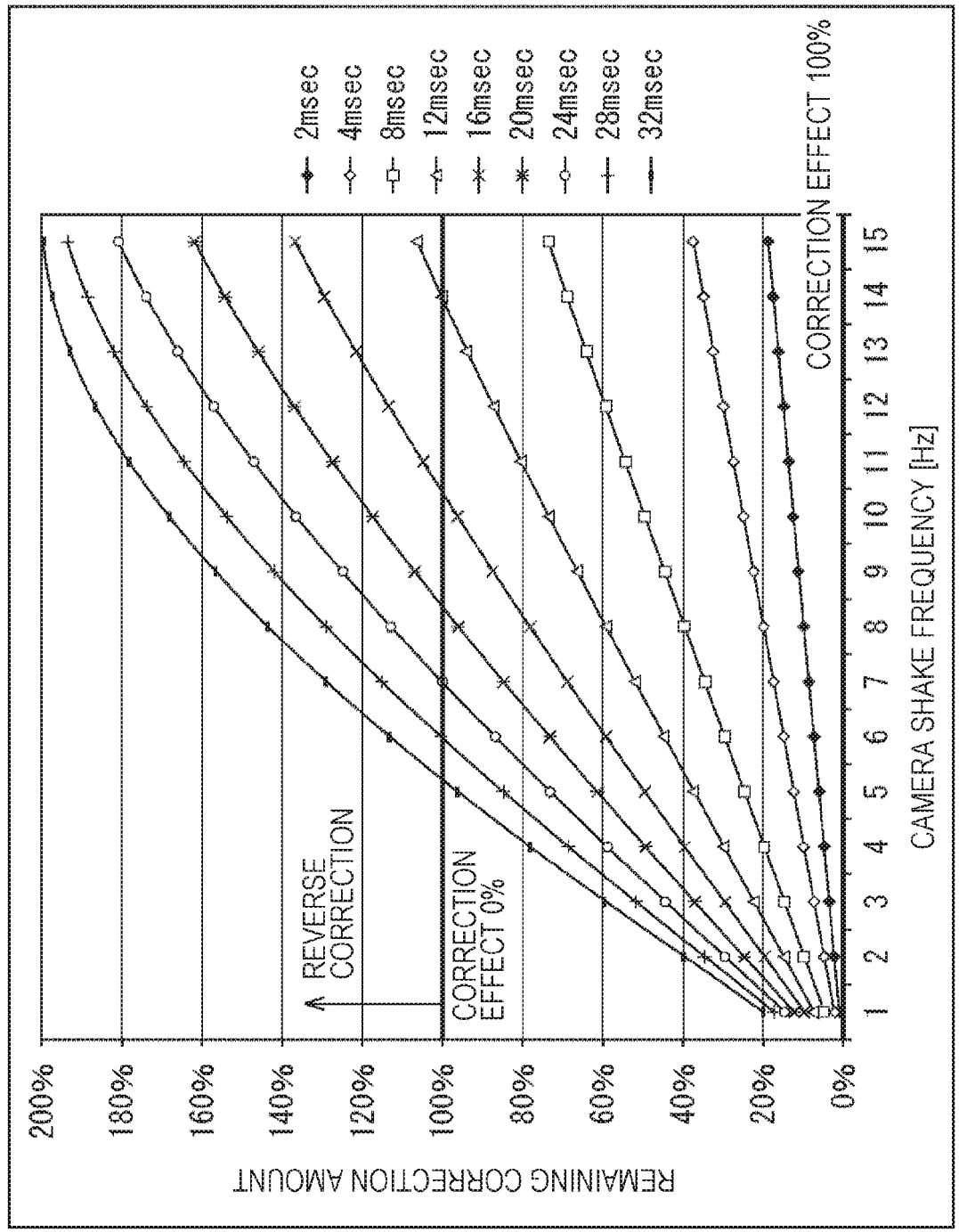
FIG. 7 is a diagram for explaining effects of correction.

FIG. 7 illustrates a result of simulation on the deviation of the reference time center of gravity and effects of the motion correction. In the graph illustrated in FIG. 7, the lateral axis represents the motion frequency (Hz) and the longitudinal axis represents a remaining correction amount. Furthermore, FIG. 7 illustrates a graph for each of 2, 4, 8, 12, 16, 20, 24, 28, and 32 (msec) as the deviation of the reference time center of gravity.

In FIG. 7, the line of the remaining correction amount of 100% means a state of the correction not being effective (0%) and a case where the remaining correction amount is 100% or more indicates that correction is performed in a reverse direction (correction is erroneously performed). It can be seen that, as the deviation of the reference time center of gravity becomes larger or the motion frequency becomes larger, the line of the correction effect 0% becomes easier to be exceed.

Furthermore, it can be seen that, when there is a deviation in the reference time center of gravity, the remaining correction amount is produced even if a camera shake frequency is small and a situation where the correction is not sufficiently completed is brought about.

From this result, it can be seen that the remaining correction is produced when there is a deviation from the appropriate reference time center of gravity and, when a deviation from the appropriate reference time center of gravity becomes larger, it becomes difficult to obtain the effect of the motion correction, which further leads to a possibility of resulting in erroneous correction.

According to the present technology, as described above, since an appropriate reference time center of gravity can be set (since the deviation of the reference time center of gravity can be made approximately zero), it becomes possible to perform an appropriate correction.

Second Embodiment: Acquisition of Motion Correction Amount in Frame

In the first embodiment, the description has been given of an example in which the motion correction amount is calculated between frames to perform the motion correction. In different terms, the description has been given of one embodiment in which one motion correction amount is calculated for one frame and the motion correction is performed on the one frame.

As a second embodiment, a description will be given of an example in which a plurality of motion correction amounts are calculated within a frame and the motion correction is conducted using these calculated motion correction amounts. In the description here, a case will be exemplified in which a motion correction amount is calculated for each line in a frame and the motion correction is conducted for each line.

Figure 8:
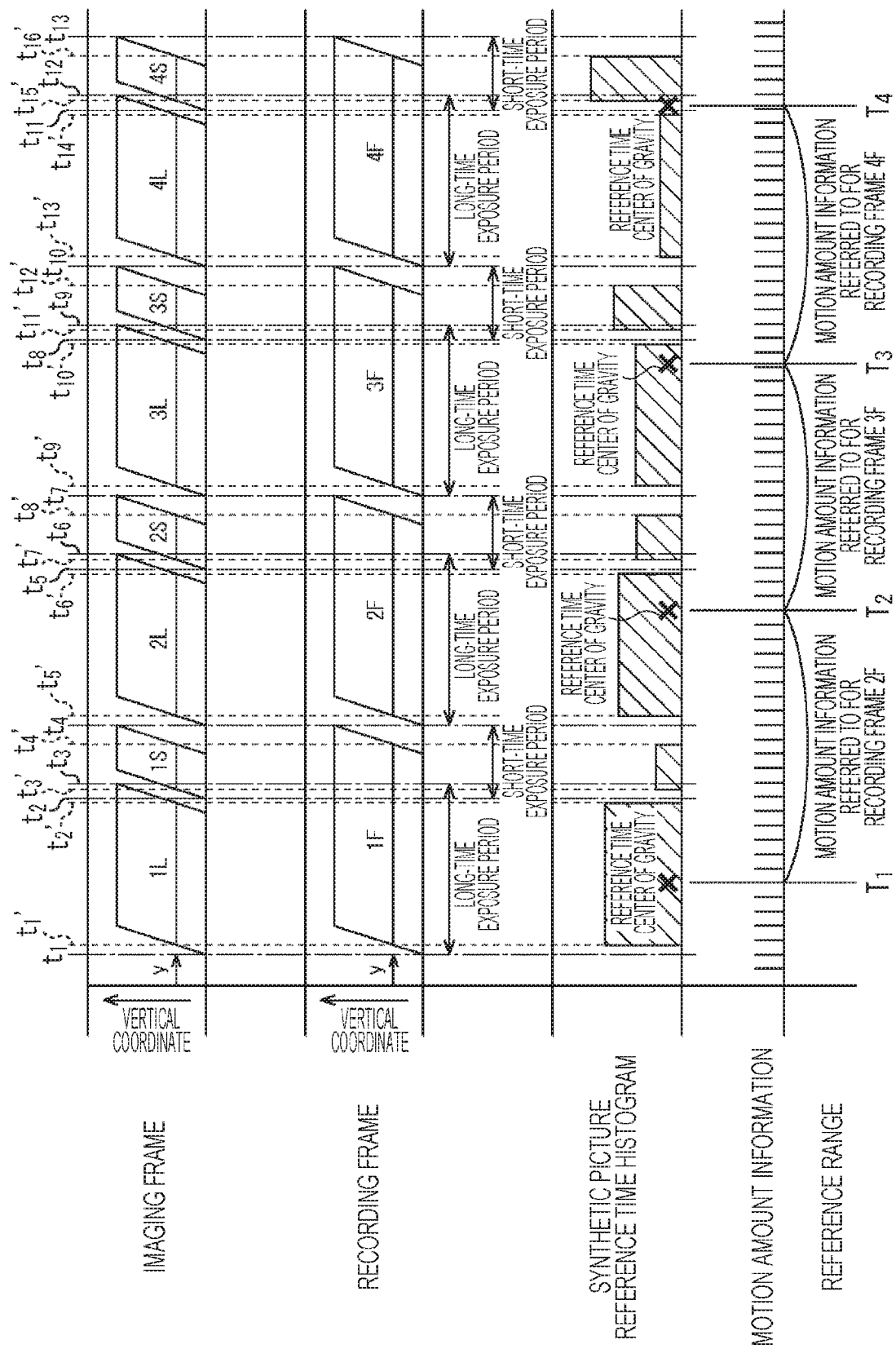
FIG. 8 is a diagram for explaining a case of finding the reference time center of gravity for each line.

FIG. 8 is a diagram illustrating relationships between an imaging frame, a recording frame, a synthetic picture reference time histogram, the motion amount information, and a reference range, as in FIG. 4. For example, the synthetic picture reference time histogram is generated for a line y obtained by illustrating a line in a lateral direction (y-axis direction) of the imaging frame (recording frame).

In the second embodiment, a histogram is generated for each line such that, on the basis of this histogram, the reference time center of gravity is found for each line, the reference range of the motion amount information is set, the motion correction amount is calculated, and the motion correction is performed.

For example, the line y is a line that has been exposed between time t1' and time t2' within the long-time exposure time and also has been exposed between time t3' and time t4' within the short-time exposure time. In this case, the histogram associated with the line y within the long-time exposure image is created referring to the blending ratio set between the time t1' and the time t2'. Furthermore, the histogram associated with the line y within the short-time exposure image is created referring to the blending ratio set between the time t3' and the time t4'.

The histograms created in this manner are used to set the reference time center of gravity for the line y within the recording frame.

Since the process can be performed in the same manner as in the first embodiment which performs the process for each frame, except that such a process is performed for each line, a detailed description thereof will be omitted.

<How to Find Reference Time Center of Gravity>

As described above, in the present technology, the reference time center of gravity is found in consideration of the blending ratio between the long-time exposure image and the short-time exposure image. Here, a further explanation will be given on how to find the reference time center of gravity. In the following explanation, a case where the time t1 to time t4 (long-time exposure time) in FIG. 4 is 16 (msec) will be described as an example.

A reference time matrix is defined as follows.

$$T=\{1,2,3,4,5,6,7,8,9,10,11,12,13,14,15,16\} \quad (1)$$

Although the case of 16 (msec) is exemplified here, the number of factors can be specified as N.

In formula (1), each factor indicates the elapsed time from Vsync. For example, the first factor corresponds to a section where the elapsed time from Vsync is 0 to 1 msec. The accuracy of the computation of the histogram is specified as 1 msec here but is not limited to this accuracy.

Next, a reference time identification matrix of a pixel [y][x] is defined as follows.

$$A[y][x]=\text{Reference time identification matrix of pixel } [y][x] \quad (2)$$

An example of the reference time identification matrix A[y][x] is indicated below. For example, taking a column analog-to-digital (AD) configuration of an AD converter common to the CMOS sensor, as an example, imaging is performed at the same time for pixels in an x direction. In this case, an example of formula (2) can be indicated as follows.

$$A[y][x] = A[y][0] = \{\{0, 0, 1, 1, 1, 1, 1, 1, 1, 1, 1, 1, 0, 0, 0, 0\},$$
$$\{0, 0, 0, 0, 0, 0, 0, 0, 0, 0, 0, 0, 0, 1, 1, 1\}\}$$

Here, the first factor is a reference time identification matrix of the long-time exposure image at the pixel [y][x] and the second factor is a reference time identification matrix of the short-time exposure image at the pixel [y][x]. Furthermore, the numerical values in the above-mentioned reference time identification matrix are identification information in which 1 is specified when being referred to and 0 is specified when not being referred to.

Next, a synthesis rate row example is defined as follows.

$$B[y][x]=\text{Synthesis rate matrix of pixel}[y][x] \quad (3)$$

An example of the synthesis rate matrix B[y][x] is indicated below.

$$B[y][x]=\{0.8, 0.2\}$$

In the case of this example, it means that the long-time exposure image is synthesized at a proportion of 0.8 and the short-time exposure image is synthesized at a proportion of 0.2 for a predetermined pixel.

A synthetic image reference time histogram hist[y] of the same line (y coordinate) is defined as follows.

[Mathematical Formula 1]

$$\text{hist}[y][n]=\Sigma_{m=0}^{1}\Sigma_{x=0}^{X-1}(A[y][0][m][n]\cdot B[y][x][m])/X \quad (4)$$

In formula (4), n is a value that takes n=0, 1, ..., N−1 and N represents the number of factors of T in formula (1). Furthermore, m represents a reference imaging frame number and, in a case where two frames of the long-time exposure image and the short-time exposure image are referred to, m=0, 1 is satisfied.

An example of the synthetic image reference time histogram hist[y] will be indicated. In the following example, B[y][x] is {0.8, 0.2} irrespective of x and the case of the same synthesis rate on the same row is exemplified.

Furthermore, the following example indicates a case using the example of formula (1), the example of formula (2), and the example of formula (3) described above.

hist[y]={0, 0, 0.8, 0.8, 0.8, 0.8, 0.8, 0.8, 0.8, 0.8, 0.8, 0.8, 0, 0.2, 0.2, 0.2}

Through the processes so far, a histogram is generated for each line. As in the second embodiment, in a case where a histogram is generated for each line and the reference time center of gravity is calculated for each line, a histogram for each line is generated in formula (4) and the reference time center of gravity for each line is calculated by following formula (5).

A time center of gravity center(hist[y]) of the synthetic image reference time histogram, that is, the reference time center of gravity, is found by the following formula.

[Mathematical Formula 2]

$$\text{center}(\text{hist}[y])=\Sigma_{n=0}^{N-1}\Sigma_{m=0}^{1}\Sigma_{x=0}^{X-1}(A[y][0][m][n]\cdot B[y][x][m]\cdot T)/X/N \quad (5)$$

An example of the time center of gravity center(hist[y]) of the synthetic image reference time histogram will be indicated. As with the above example of hist[y], this example is a case using the example of formula (1), the example of formula (2), and the example of formula (3) described above and indicates a case using the example of formula (4).

center(hist[y])=(0.1, 0.2, 0.8.3, 0.8.4, 0.8.5, 0.8.6, 0.8.7, 0.8.8, 0.8.9, 0.8.10, 0.8.11, 0.8.12, 0.13, 0.2.14, 0.2.15, 0.2.16)/16=4.3125 (msec)

The reference time center of gravity is calculated for each line in this manner.

As in the first embodiment, in a case where the histogram is created for each frame and the reference time center of gravity is calculated for each frame, the histogram is created by the formula below.

[Mathematical Formula 3]

$$\text{hist}=\Sigma_{y=0}^{Y-1}\text{hist}[y]/Y \quad (6)$$

In formula (6), hist[y] is a histogram calculated by formula (4). Formula (6) is a formula that generates a histogram of a frame by integrating a histogram (histogram in the lateral direction) for each line indicated by formula (4) in a longitudinal direction.

The time center of gravity center(hist) of the synthetic image reference time histogram, that is, the reference time center of gravity, is found by the following formula, from the synthetic image reference time histogram of one frame calculated on the basis of formula (6).

[Mathematical Formula 4]

$$\text{center}(\text{hist})=\Sigma_{y=0}^{Y-1}\text{center}(\text{hist}[y])/Y \quad (7)$$

The time center of gravity of the synthetic image reference time histogram of the entire frame, that is, the reference time center of gravity of one frame, is found by formula (7).

Note that it is explained here with reference to, for example, FIG. 4 or 8 that the reference time center of gravity is found after creating the histogram, but the reference time center of gravity may be found directly by omitting the step of creating the histogram.

For example, the step of finding the synthetic image reference time histogram in above-described formula (4) (or formula (6)) may be omitted such that the time center of gravity of the synthetic image reference time histogram is calculated by formula (5) (or formula (7)).

Third Embodiment: Another Configuration of Image Processing Unit

Figure 9:
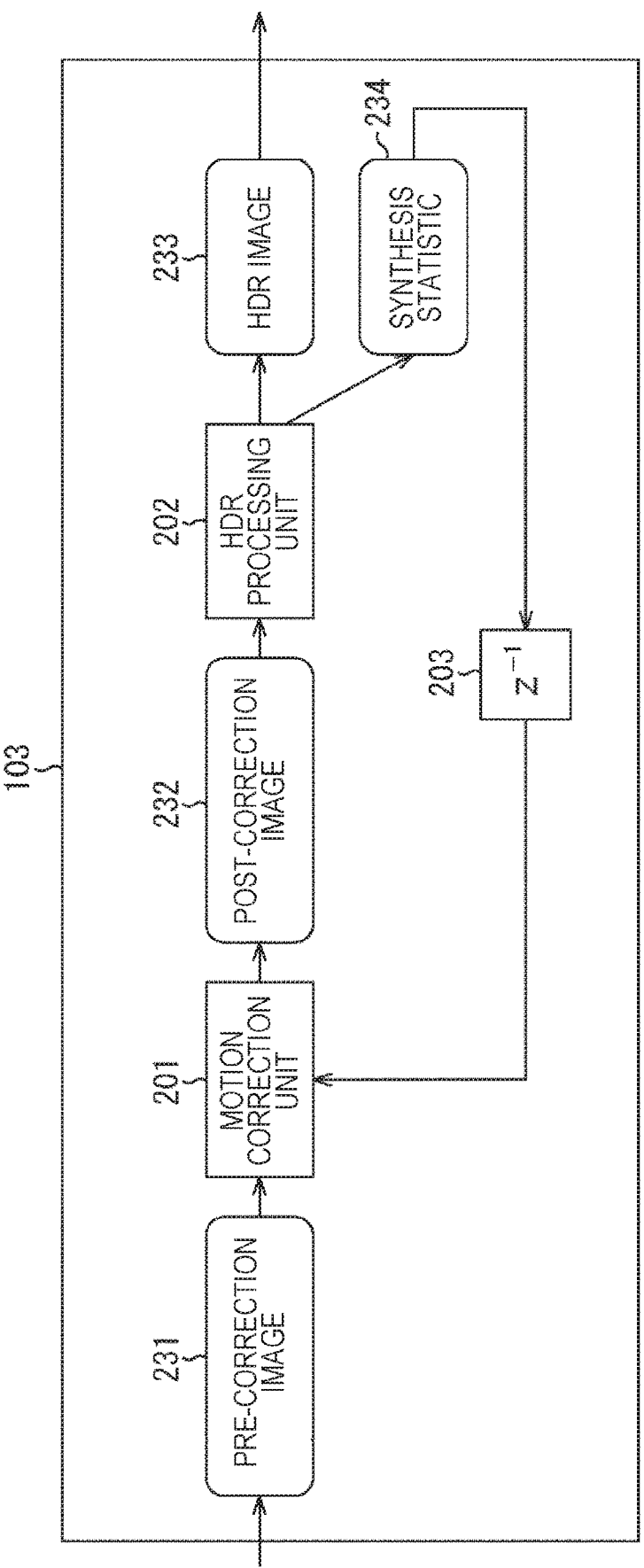
FIG. 9 is a diagram for explaining another configuration of the image processing unit.

Next, another configuration of the image processing unit 103 will be described. FIG. 9 is a diagram illustrating another configuration of the image processing unit 103. As in the image processing unit 103 illustrated in FIG. 3, an image processing unit 103 illustrated in FIG. 9 performs the generation process for the high dynamic range image, the motion correction process, and the like.

A pre-correction image 231 from an imaging element 102 is input to the image processing unit 103 illustrated in FIG. 3. The pre-correction image 231 is supplied to a motion correction unit 201. The motion correction unit 201 performs the motion correction on the supplied pre-correction image 231. A synthesis statistic 234 output from an HDR processing unit 202 is supplied to the motion correction unit 201 via a feedback unit 203 and the motion correction unit 201 performs the motion correction on the pre-correction image 231 on the basis of the supplied synthesis statistic 234.

In the above-described example, the pre-correction image 231 means the long-time exposure image and the short-time exposure image and the motion correction unit 201 performs the motion correction on each of the long-time exposure image and the short-time exposure image.

A post-correction image 232 to which the motion correction has been applied by the motion correction unit 201 is supplied to the HDR processing unit 202. The HDR processing unit 202 generates an HDR image 233 from the supplied post-correction images 232 (for example, the long-time exposure image and the short-time exposure image to which the motion correction has been applied) to supply to the signal processing unit 104 (FIG. 2).

When generating the HDR image 233 (generating a synthetic image), the HDR processing unit 202 also generates the synthesis statistic 234 to supply to the motion correction unit 201 via the feedback unit 203. As described above with reference to FIG. 4 and other drawings, the total statistic 234 is a statistic associated with the time for which each of the long-time exposure image and the short-time exposure image is referred to, when the HDR image 233 is generated (the histogram or the reference time center of gravity found from the histogram).

The image processing unit 103 illustrated in FIG. 3 has a processing flow of performing the motion correction after generating the HDR image, but the image processing unit 103 illustrated in FIG. 9 differs from the image processing unit 103 illustrated in FIG. 3 in having a processing flow of generating the HDR image after performing the motion correction.

Since the image processing units 103 individually illustrated in FIGS. 3 and 9 are similar in that the synthesis statistic is generated when the HDR image is generated and the motion correction is performed using this synthesis statistic, the embodiments described as the first and second embodiments can also be applied to the image processing unit 103 illustrated in FIG. 9. Accordingly, a detailed description of the process of the image processing unit 103 illustrated in FIG. 9 is omitted here.

The image processing unit 103 illustrated in FIG. 9 has a processing flow of generating the HDR image after performing the motion correction, in different terms, a processing flow of feeding back the synthesis statistic 234 by the feedback unit 203, in still different terms, since an (n+1)-th frame is generated using the synthesis statistic 234 when an n-th frame was converted into the HDR image, the motion correction is performed with the synthesis statistic 234 delayed by 1V.

However, since the synthesis statistic 234 is not such information as to change greatly for each frame, the accuracy will not be lowered significantly even if such a delay occurs.

According to the present technology, the motion correction using the time at which the synthetic image was captured, as a criterion is enabled and the correction accuracy of the motion correction can be prevented from being lowered due to the result of synthesis, such that the effect of the motion correction can be demonstrated in a state close to 100%.

Note that the motion correction when the long-time exposure image and the short-time exposure image are captured and the HDR image is generated has been described here as an example, but the application range of the present technology is not limited only to such imaging and correction.

The present technology can be applied to a case where a plurality of pictures shot at different shooting timings is synthesized. The plurality of pictures means the two images of the long-time exposure image and the short-time exposure image in the above example, but the present technology can be applied also to a case where two or more images are synthesized.

For example, the present technology can be applied also to a case where a noise reduction process is performed by synthesizing a plurality of pictures shot at different shooting timings. In other words, the present technology can be applied to the noise reduction process besides the motion correction.

Furthermore, in the above-described embodiments, the description has been given of an example in which the short-time exposure image is captured after the long-time exposure image is captured. In other words, a case where the long-time exposure image and the short-time exposure image are captured by time sharing has been described as an example. However, the present technology can also be applied to a case where the long-time exposure image and the short-time exposure image are captured in a manner other than time sharing, for example, by space sharing.

For example, the present technology can be applied even to a case where pixels for imaging the long-time exposure image and pixels for imaging the short-time exposure image are arranged in a pixel array unit (not illustrated) such that, while the long-time exposure image is being shot (during the long-time exposure period), the short-time exposure image is shot (the short-time exposure period coexists therewith). Even in a case where the long-time exposure image and the short-time exposure image are captured by space sharing, the long-time exposure image and the short-time exposure image are images captured at different timings and the present technology can be applied to a case where such images captured at different timings are synthesized.

Furthermore, according to the present technology, the reference time center of gravity is set in accordance with the synthesis ratio (blending ratio) when images captured at different timings are synthesized such that a section for which the motion amount information is referred to is set, whereby an appropriate section can be set. As a process using the motion amount information to be referred to by setting such an appropriate section, correction (process) other than the above-described motion correction may be performed and, even in a case where a process other than the motion correction is performed, the accuracy of such a process can be improved.

Furthermore, in the above-described embodiments, a case where the long-time exposure image and the short-time exposure image are captured has been described as an example. However, for example, the present technology can also be applied to a case where an image shot when infrared (IR) is projected thereon and an image shot while the IR is not being projected thereon (an image shot with ambient light) are synthesized.

<About Recording Medium>

A series of the above-described processes can be executed by hardware as well and also can be executed by software. In a case where the series of the processes is executed by software, a program constituting the software is installed in a computer. Herein, the computer includes a computer built into dedicated hardware and a computer capable of executing various functions when installed with various programs, for example, a general-purpose personal computer and the like.

Figure 10:
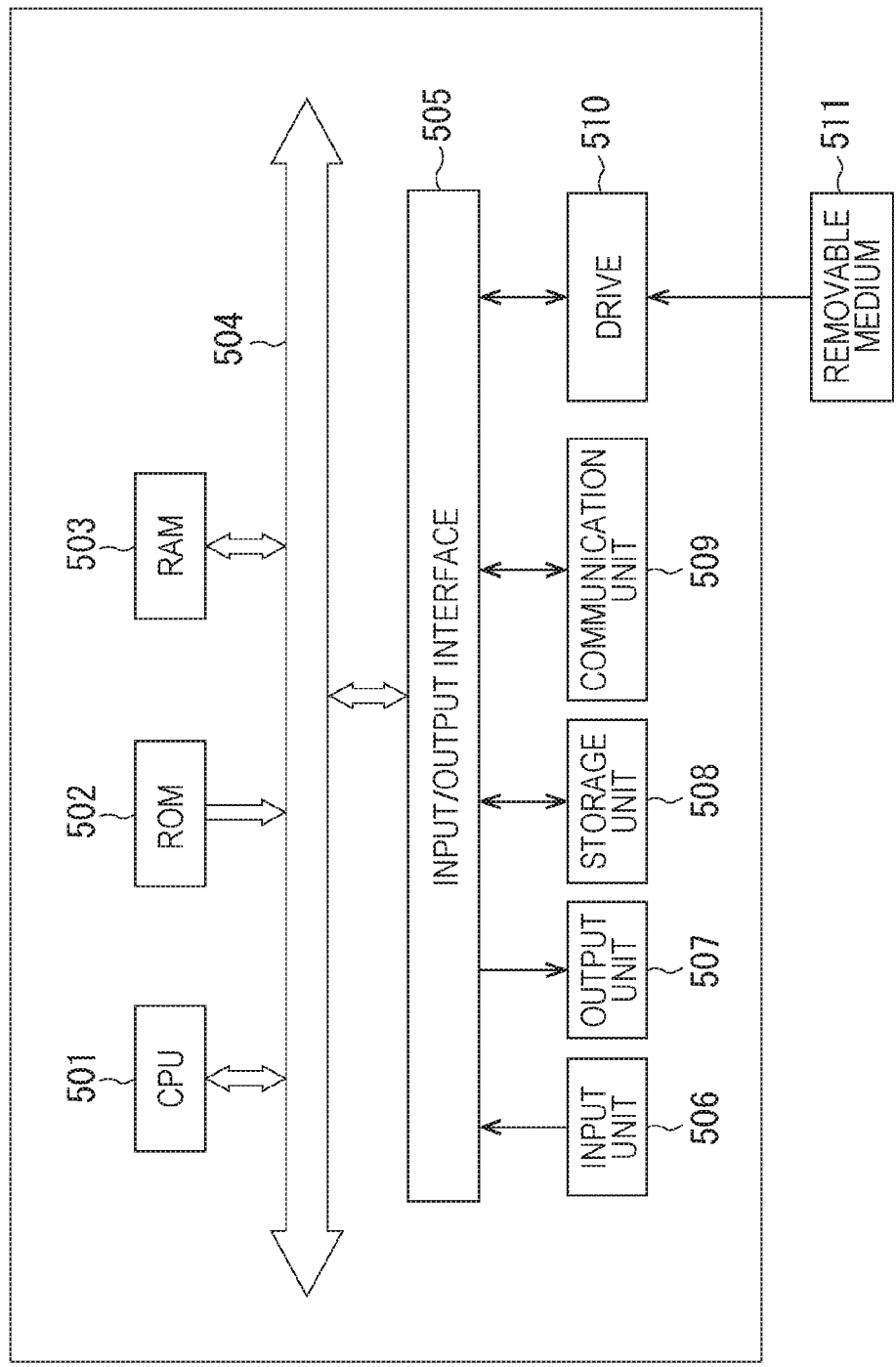
FIG. 10 is a diagram for explaining a recording medium.

FIG. 10 is a block diagram illustrating an exemplary hardware configuration of a computer that executes the above-described series of the processes using a program. In the computer, a central processing unit (CPU) 501, a read only memory (ROM) 502, and a random access memory (RAM) 503 are interconnected through a bus 504. Moreover, an input/output interface 505 is connected to the bus 504. An input unit 506, an output unit 507, a storage unit 508, a communication unit 509, and a drive 510 are connected to the input/output interface 505.

The input unit 506 includes a keyboard, a mouse, a microphone, and the like. The output unit 507 includes a display, a speaker, and the like. The storage unit 508 includes a hard disk, a non-volatile memory, and the like. The communication unit 509 includes a network interface and the like. The drive 510 drives a removable medium 511 such as a magnetic disk, an optical disc, a magneto-optical disk, or a semiconductor memory.

In the computer configured as described above, for example, a series of the above-described processes is performed in such a manner that the CPU 501 loads a program stored in the storage unit 508 to the RAM 503 via the input/output interface 505 and the bus 504 to execute.

For example, the program executed by the computer (CPU 501) can be provided by being recorded in the removable medium 511 serving as a package medium or the like. Furthermore, the program can be provided via a wired or wireless transmission medium such as a local area network, the Internet, or digital satellite broadcasting.

In the computer, the program can be installed to the storage unit 508 via the input/output interface 505 by mounting the removable medium 511 in the drive 510. Furthermore, the program can be installed to the storage unit 508 via a wired or wireless transmission medium when received by the communication unit 509. As an alternative manner, the program can be installed to the ROM 502 or the storage unit 508 in advance.

Note that, the program executed by a computer may be a program in which the processes are performed along the time series in accordance with the order described in the present description, or alternatively, may be a program in which the processes are performed in parallel or at a necessary timing, for example, when called.

Furthermore, in the present description, the term "system" refers to the entire apparatus constituted by a plurality of apparatuses.

Note that the effects described in the present description merely serve as examples and not construed to be limited. There may be another effect as well.

Note that the embodiments of the present technology are not limited to the embodiments described above and a variety of modifications can be made without departing from the gist of the present technology.

Note that the present technology can also be configured as described below.

(1)

An image processing apparatus including:

a synthesizing unit that synthesizes a plurality of images captured at different timings; and a motion correction unit that performs correction that reduces influence on the images relating to motion, in which the motion correction unit:

sets a criterion of a section for which motion amount information relating to a motion amount supplied at a predetermined interval is referred to, on the basis of a synthesis ratio when the plurality of images is synthesized; and refers to the motion amount information according to the set criterion to perform the correction.

(2)

The image processing apparatus according to (1) above, in which the plurality of images is a long-time exposure image captured during a long-time exposure period and a short-time exposure image captured during a short-time exposure period, and the synthesizing unit synthesizes the long-time exposure image and the short-time exposure image at the synthesis ratio to generate an image with a higher dynamic range.

(3)

The image processing apparatus according to (1) above, in which the plurality of images is a plurality of images captured with the same exposure time and captured at different timings, and the synthesizing unit synthesizes the plurality of images to generate an image with reduced noise.

(4)

The image processing apparatus according to any one of (1) to (3) above, in which the motion correction unit:

specifies a histogram relating to time at which a synthetic image generated by synthesizing a plurality of images in the synthesizing unit refers to the plurality of images, as a statistic, and sets the criterion according to the statistic.

(5)

The image processing apparatus according to (4) above, in which the criterion is set for each of the synthetic images.

(6)

The image processing apparatus according to (4) above, in which the criterion is set for each line of the synthetic image.

(7)

The image processing apparatus according to any one of (1) to (6) above, in which the motion correction unit performs correction on a synthetic image generated by synthesizing a plurality of images in the synthesizing unit.

(8)

The image processing apparatus according to any one of (1) to (6) above, in which the synthesizing unit synthesizes the plurality of images to which correction by the motion correction unit has been applied.

(9)

An image processing method including a process including steps of:

synthesizing a plurality of images captured at different timings; and performing motion correction that reduces influence on the images relating to motion, the process performing the motion correction by:

setting a criterion of a section for which motion amount information relating to a motion amount supplied at a predetermined interval is referred to, on the basis of a synthesis ratio when the plurality of images is synthesized; and referring to the motion amount information according to the set criterion.

(10)

An imaging apparatus including an image processing apparatus provided with:

a synthesizing unit that synthesizes a plurality of images captured at different timings; and a motion correction unit that performs correction that reduces influence on the images relating to motion, in which the motion correction unit:

sets a criterion of a section for which motion amount information relating to a motion amount supplied at a predetermined interval is referred to, on the basis of a synthesis ratio when the plurality of images is synthesized; and refers to the motion amount information according to the set criterion to perform the correction.

(11)

A program for causing a computer to execute:

a process including steps of:

synthesizing a plurality of images captured at different timings; and performing motion correction that reduces influence on the images relating to motion, the process performing the motion correction by:

setting a criterion of a section for which motion amount information relating to a motion amount supplied at a predetermined interval is referred to, on the basis of a synthesis ratio when the plurality of images is synthesized; and referring to the motion amount information according to the set criterion.

REFERENCE SIGNS LIST

100 Imaging apparatus
101 Optical lens
102 Imaging element
103 Image processing unit
104 Signal processing unit
105 Control unit
131 HDR processing unit
132 Motion correction unit
201 Motion correction unit
202 HDR processing unit
203 Feedback unit

The invention claimed is:

1. An image processing apparatus comprising:

a processor, and a memory storing program code, the program code being executable by the processor to perform operations comprising:

a synthesizing process that synthesizes a plurality of images captured at different timings; and a motion correction process that performs correction that reduces influence on the images relating to motion, wherein the motion correction process:

receives motion amount information that relates to a motion amount of the image processing apparatus;

sets a reference time center of gravity on the basis of a synthesis ratio when the plurality of images is synthesized; and refers to the motion amount information over a predetermined interval that starts at the reference time center of gravity to perform the correction.

2. The image processing apparatus according to claim 1, wherein the plurality of images is a long-time exposure image captured during a long-time exposure period and a short-time exposure image captured during a short-time exposure period, and the synthesizing process synthesizes the long-time exposure image and the short-time exposure image at the synthesis ratio to generate an image with a higher dynamic range.

3. The image processing apparatus according to claim 1, wherein the plurality of images is a plurality of images captured with the same exposure time and captured at different timings, and the synthesizing process synthesizes the plurality of images to generate an image with reduced noise.

4. The image processing apparatus according to claim 1, wherein the motion correction process:

specifies a histogram relating to time at which a synthetic image generated by synthesizing a plurality of images in the synthesizing process refers to the plurality of images, as a statistic, and sets the reference time center of gravity according to the statistic.

5. The image processing apparatus according to claim 4, wherein the synthetic image is one of a plurality of synthetic images, and the reference time center of gravity is set for each of the synthetic images.

6. The image processing apparatus according to claim 4, wherein the reference time center of gravity is set for each line of the synthetic image.

7. The image processing apparatus according to claim 1, wherein the motion correction process performs correction on a synthetic image generated by synthesizing a plurality of images in the synthesizing process.

8. The image processing apparatus according to claim 1, wherein the synthesizing process synthesizes the plurality of images to which correction by the motion correction process has been applied.

9. The image processing apparatus according to claim 1, wherein the motion amount information is received from a sensor.

10. An image processing method for an image processing apparatus, the method comprising:

performing a synthesizing process that synthesizes a plurality of images captured at different timings; and performing a motion correction process that reduces influence on the images relating to motion, wherein the motion correction process:

receives motion amount information that relates to a motion amount of the image processing apparatus;

sets a reference time center of gravity on the basis of a synthesis ratio when the plurality of images is synthesized; and refs to the motion amount information over a predetermined interval that starts at the reference time center of gravity to perform the motion correction process.

11. The image processing method according to claim 10, wherein the motion amount information is received from a sensor.

12. The image processing method according to claim 10, wherein
the plurality of images is a long-time exposure image captured during a long-time exposure period and a short-time exposure image captured during a short-time exposure period, and
the synthesizing process synthesizes the long-time exposure image and the short-time exposure image at the synthesis ratio to generate an image with a higher dynamic range.

13. The image processing method according to claim 10, wherein
the plurality of images is a plurality of images captured with the same exposure time and captured at different timings, and
the synthesizing process synthesizes the plurality of images to generate an image with reduced noise.

14. The image processing method according to claim 10, wherein
the motion correction process:
specifies a histogram relating to time at which a synthetic image generated by synthesizing a plurality of images in the synthesizing process refers to the plurality of images, as a statistic, and
sets the reference time center of gravity according to the statistic.

15. The image processing method according to claim 14, wherein
the synthetic image is one of a plurality of synthetic images, and the reference time center of gravity is set for each of the synthetic images.

16. A non-transitory computer readable medium storing program code for performing a correction process for an image processing apparatus, the program code being executable to perform operations comprising:

a synthesizing process that synthesizes a plurality of images captured at different timings; and
a motion correction process that performs motion correction that reduces influence on the images relating to motion,
wherein the motion correction process:
receives motion amount information that relates to a motion amount of the image processing apparatus;
sets a reference time center of gravity on the basis of a synthesis ratio when the plurality of images is synthesized; and
refers to the motion amount information over a predetermined interval that starts at the reference time center of gravity to perform the motion correction process.

17. The non-transitory computer readable medium according to claim 16, wherein the motion amount information is received from a sensor.

18. The non-transitory computer readable medium according to claim 16, wherein
the plurality of images is a long-time exposure image captured during a long-time exposure period and a short-time exposure image captured during a short-time exposure period, and
the synthesizing process synthesizes the long-time exposure image and the short-time exposure image at the synthesis ratio to generate an image with a higher dynamic range.

19. The non-transitory computer readable medium according to claim 16, wherein
the plurality of images is a plurality of images captured with the same exposure time and captured at different timings, and
the synthesizing process synthesizes the plurality of images to generate an image with reduced noise.

20. The non-transitory computer readable medium according to claim 16,
wherein
the motion correction process:
specifies a histogram relating to time at which a synthetic image generated by synthesizing a plurality of images in the synthesizing process refers to the plurality of images, as a statistic, and
sets the reference time center of gravity according to the statistic.

* * * * *